US011653314B2

(12) United States Patent
Wei et al.

(10) Patent No.: US 11,653,314 B2
(45) Date of Patent: *May 16, 2023

(54) BASE STATION AND USER EQUIPMENT

(71) Applicants: Sony Group Corporation, Tokyo (JP); Sony Mobile Communications Inc., Tokyo (JP)

(72) Inventors: Yuxin Wei, Basingstoke (GB); Vivek Sharma, Basingstoke (GB); Anders Berggren, Lund (SE); Hideji Wakabayashi, Basingstoke (GB); Shinichiro Tsuda, Basingstoke (GB)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,360

(22) Filed: May 10, 2021

(65) Prior Publication Data

US 2021/0282092 A1     Sep. 9, 2021

Related U.S. Application Data

(63) Continuation of application No. 16/646,574, filed as application No. PCT/EP2018/076085 on Sep. 26, 2018, now Pat. No. 11,012,950.

(30) Foreign Application Priority Data

Sep. 28, 2017   (EP) .................................. 17193901

(51) Int. Cl.
*H04W 52/34*      (2009.01)
*H04W 52/14*      (2009.01)
(Continued)

(52) U.S. Cl.
CPC ......... *H04W 52/34* (2013.01); *H04W 52/146* (2013.01); *H04W 52/365* (2013.01); *H04W 84/042* (2013.01)

(58) Field of Classification Search
CPC . H04W 52/146; H04W 52/34; H04W 52/365; H04W 84/042
(Continued)

(56) References Cited

U.S. PATENT DOCUMENTS 11,012,950  B2 *  5/2021  Wei ..................... H04W 52/146
2012/0176923 A1 * 7/2012 Hsu ..................... H04W 52/243
                                                                370/252
(Continued)

OTHER PUBLICATIONS

International Search Report and Written Opinion dated Nov. 16, 2018 for PCT/EP2018/076085 filed on Sep. 26, 2018, 11 pages.
(Continued)

*Primary Examiner* — Tan H Trinh
(74) *Attorney, Agent, or Firm* — Xsensus LLP

(57) ABSTRACT

The present disclosure pertains to a user equipment for a mobile telecommunications system includes circuitry including a receiver and a transmitter and which is configured to communicate with a new radio base station and a LTE base station. The circuitry is further configured to indicate a co-existence indication to the new radio base station or to the LTE base station; and receive a power control instruction for controlling power output of the transmitter.

20 Claims, 7 Drawing Sheets

(51) Int. Cl.
*H04W 52/36* (2009.01)
*H04W 84/04* (2009.01)

(58) Field of Classification Search
USPC .................................. 455/522; 370/252, 329
See application file for complete search history.

(56) References Cited

U.S. PATENT DOCUMENTS

| | | |
|---|---|---|
| 2012/0213116 A1 | 8/2012 | Koo et al. |
| 2013/0194951 A1 | 8/2013 | Kim et al. |
| 2013/0324113 A1 | 12/2013 | Jechoux et al. |
| 2014/0071904 A1 | 3/2014 | Koo et al. |
| 2014/0269534 A1* | 9/2014 | Persson ................. H04W 16/14 370/329 |
| 2015/0014106 A1 | 1/2015 | Galasso et al. |
| 2015/0049705 A1 | 2/2015 | Feuersaenger |
| 2015/0208452 A1 | 7/2015 | Lee et al. |
| 2015/0215944 A1 | 7/2015 | Kim et al. |
| 2015/0381254 A1 | 12/2015 | Liang |
| 2016/0174233 A1 | 6/2016 | Emmanuel |
| 2016/0227524 A1* | 8/2016 | Choi ......................... H04L 5/00 |
| 2017/0142667 A1 | 5/2017 | Takeda |
| 2018/0034524 A1 | 2/2018 | Pao et al. |
| 2018/0092085 A1* | 3/2018 | Shaheen ........... H04W 36/0022 |
| 2018/0110088 A1 | 4/2018 | Zhu et al. |
| 2019/0069312 A1 | 2/2019 | Oh et al. |
| 2019/0313475 A1 | 10/2019 | Siomina |

OTHER PUBLICATIONS

3GPP, "5G; Evolved Universal Terrestrial Radio Access (E-UTRA); Medium Access Control {MAC} protocol specification," Technical Specification 36.321 version 15.6.0, Release 15, Jun. 2019, pp. 1-133.

3GPP, "Signalling for Single/Dual UL Tx (current status)," RAN2 Chairman (Intel), Status Report to Ran#77, RP-172082, 2017, pp. 1-2.

Huawei and Hisilicon, "Power control for CA and DC," 3GPPTSG RAN WG1 Meeting #89, R1-1706904, Hangzhou, China, May 15-19, 2017, pp. 1-5.

Nokia and Alcatel-Lucent Shanghai Bell, "UE capability structure and coordination aspects for MR-DC," 3GPP TSG-RANWG2 NR Adhoc #2, R2-1706859, Qingdao, China, Jun. 27-29, 2017, 14 pages.

Nokia and Nokia Shanghai Bell, "Supporting 1Tx UE in NR," 3GPP TSG-RAN WG2 #99, R2-1707822, Berlin, Germany, Aug. 21-25, 2017, 4 pages.

Qualcomm Incorporated, "LTE/NR UE capability dependency and coordination," 3GPP TSG-RANWG2 Meeting #99, R2-1707835, Berlin, Germany, Aug. 21-25, 2017, 45 pages.

RAN WG1, "LS on Single UL transmission," 3GPP TSG RAN WG2#99, R2-1707619_R1-1711878, Berlin, Germany, Aug. 21-25, 2017, 1 page.

* cited by examiner

BASE STATION AND USER EQUIPMENT

CROSS-REFERENCE TO RELATED APPLICATIONS

The present application is a continuation of U.S. application Ser. No. 16/646,574, filed Mar. 12, 2020, which is based on PCT filing PCT/EP2018/076085, filed Sep. 26, 2018, which claims priority to EP 17193901.0, filed Sep. 28, 2017, the entire contents of each are incorporated herein by reference.

TECHNICAL FIELD

The present disclosure generally pertains to base stations and user equipments for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

As discussed, in 3GPP a work Item (WI) on New Radio Access Technology (NR) has been agreed. The new Radio Access Technology (RAT) is expected to operate in a large range of frequencies, from hundreds of MHz to 100 GHz and it is expected to cover a broad range of use cases. Use cases, which are considered, are, for example:
Enhanced Mobile Broadband (eMBB)
Massive Machine Type Communications (mMTC)
Ultra Reliable & Low Latency Communications (URLLC)

At least for initial deployment, NR and LTE are expected to coexist.

Although there exist signaling techniques for LTE, it is generally desirable to improve coexisting situations between NR and LTE.

SUMMARY

According to a first aspect, the disclosure provides a user equipment for a mobile telecommunications system comprising circuitry including a receiver and a transmitter and being configured to communicate with a new radio base station and a LTE base station, wherein the circuitry is further configured to indicate a coexistence indication to the new radio base station or to the LTE base station; and receive a power control instruction for controlling power output of the transmitter.

According to a second aspect, the disclosure provides a base station for a mobile telecommunications system comprising circuitry configured to communicate with at least one user equipment, the at least one user equipment being configured to communicate with a new radio base station and a LTE base station, wherein the circuitry is further configured to detect a coexistence indication; and transmit a power control instruction to the at least one user equipment, based on the detected coexistence indication.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
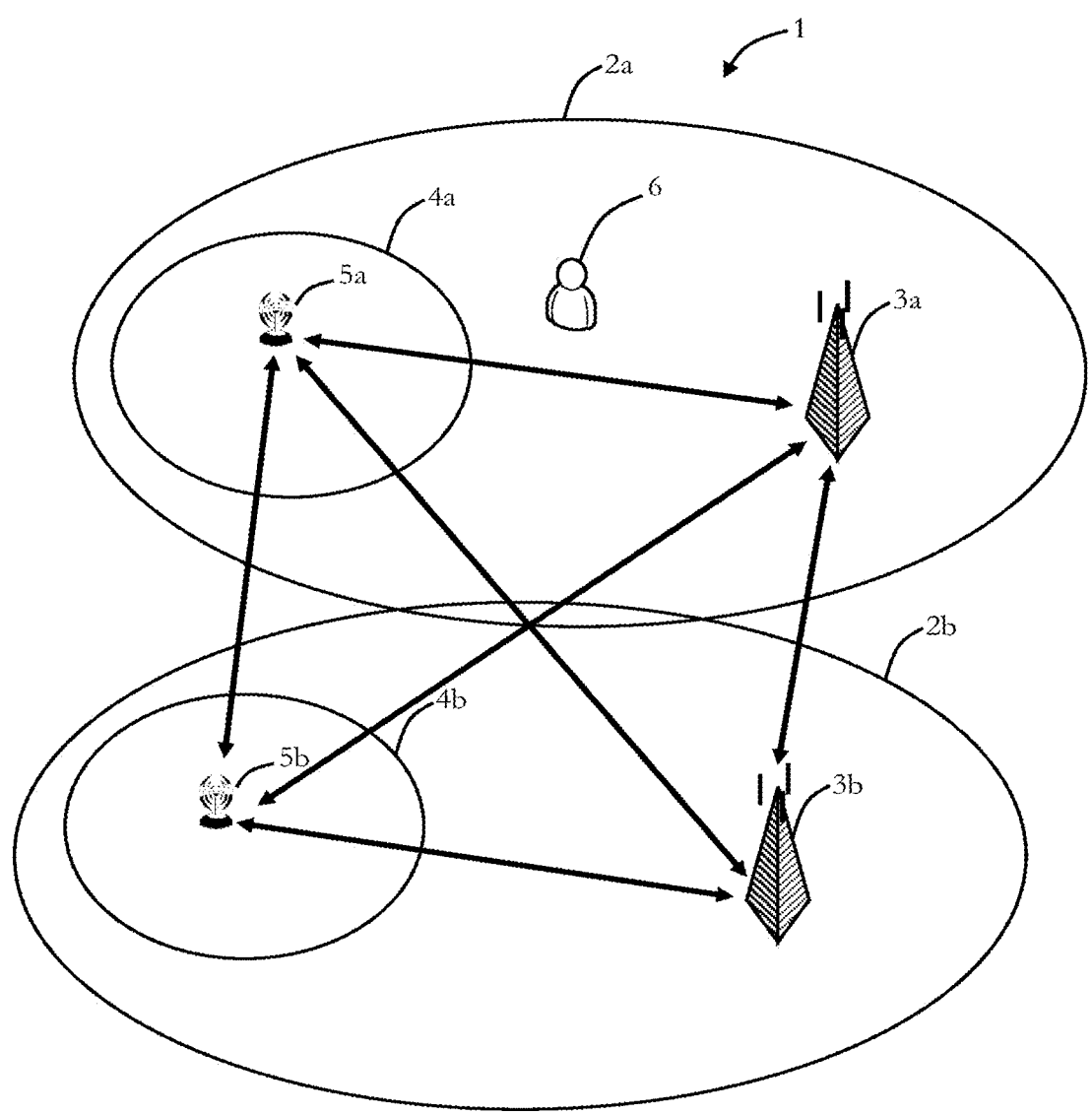
FIG. 1 illustrates a radio access network including LTE and NR base stations.

Before a detailed description of the embodiments under reference of FIG. 1 is given, general explanations are made.

As mentioned in the outset, several generations of mobile telecommunications systems are known, e.g. the third generation ("3G"), the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

As discussed, a candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

As mentioned, LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies, and there exists the successor LTE-A (LTE Advanced) allowing higher data rates than the basic LTE and which is also standardized under the control of 3GPP.

As the 5G system will be based on LTE or LTE-A, respectively, it is assumed that specific requirements of the 5G technologies and, thus, of embodiments described herein, will, basically, be dealt with by features and methods which are already defined in the LTE and LTE-A standard documentation.

As discussed, in 3GPP a work Item (WI) on New Radio Access Technology (NR) has been agreed and the new Radio Access Technology (RAT) is expected to operate in a large range of frequencies, from hundreds of MHz to 100 GHz and it is expected to cover a broad range of use cases, examples of which are given in the outset.

At least for initial deployment, NR and LTE are expected to coexist, as is also illustrated in FIG. 1. FIG. 1 illustrates an embodiment of a Radio Access Network RAN 1, which has two macro cells 2a and 2b, which are each established by a LTE (base station) eNodeB 3a and 3b. Moreover, in each of the macro cells 2a and 2b, a NR cell 4a and 4b is located, which is each established by a NR (base station) eNodeB 5a and 5b, respectively (the NR eNodeB may also be referred to as NR gNB or NR gNodeB).

A (user equipment) UE 6 can communicate with the LTE eNodeB 3a and, as long it is within the NR cell 4a, it can also communicate with the NR eNodeB 5b.

As also illustrated in FIG. 1, also the LTE eNodeBs 3a and 3b can communicate which each other, which is typically performed over the known X2-interface, but, also a communication between the LTE eNodeBs 3a and 3b and the NR eNodeBs 5a and 5b may be possible, e.g. over an Xn-interface, which is also discussed for NR. Also the NR eNodeBs 5a and 5b may communicate with each other.

Figure 2:
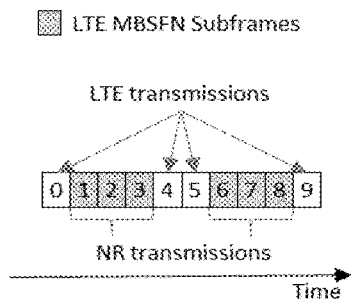
FIG. 2 illustrates the coexistence of NR and LTE subframe transmission.

The coexistence may be implemented in some embodiments, by using the same frequency resources for NR and LTE, but NR and LTE are differentiated using TDM (Time Division Multiplexing), e.g. NR uses LTE MBSFN (Multicast-Broadcast Single Frequency) subframes, as illustrated in FIG. 2.

FIG. 2 illustrates an example, where there are up to a maximum of six LTE MBSFN subframes in a radio frame. Here, exemplary, six LTE MBSFN subframes, i.e. subframes 1, 2, 3, 6, 7, 8, are used for NR transmissions and the remaining subframes are used for LTE transmissions.

Figure 3:
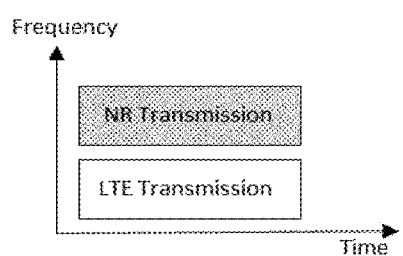
FIG. 3 illustrates the coexistence of NR and LTE transmission in the frequency domain.

Another implementation, which may be used in some embodiments as illustrated in FIG. 3, is to use separate frequency resources and implement NR as a secondary carrier in a multi-carrier operation, i.e. LTE uses one frequency carrier (lower box in FIG. 3) and NR uses another frequency carrier (upper box in FIG. 3).

One of the common deployment will be, in some embodiments, where LTE will use FDD (Frequency Division Duplexing) mode of operation and NR deploys TDD (Time Division Duplexing) mode of operation.

Such coexistence in certain frequency bands may result in two simultaneous peaks, in some embodiments, generated by the UE on uplink if simultaneous uplink in LTE and NR is configured and used.

Such peaks may generate intermodulation products, which will interfere the receiver in the UE and, in a case where, where for example, LTE deploys FDD and NR deploys TDD, the LTE downlink (DL) performance might be impacted.

Hence, in some embodiments, for such very specific frequency allocations within LTE-NR band combinations, a reference sensitivity power level degradation may be experienced due to intermodulation distortion issues, when the dual uplink (UL) transmission is used.

Moreover, according to 3GPP document RP-172085 ("Signalling for Single/Dual UL Tx (current status)"), a UE capability indicates that the UE is not allowed to have two simultaneous UL transmissions for RAN4 specified channel allocations in a given band combination. Then, according to this document, only one uplink transmission will be activated accordingly. RAN1#89 (May) agreed that 5G NR needs to support non-standalone (NSA) NR UEs, which may not be capable of transmitting on two uplinks at the same time when it is in a LTE-NR Dual Connectivity (DC) configuration, i.e. there is a need to support for single transmission (Tx) UEs for LTE-NR DC. The RAN1#89 minutes states (and agreed on) the following: "For NR NSA for a UE, NR supports the case that when the UE is configured with multiple UL carriers on different frequencies (where there is at least one LTE carrier and at least one NR carrier of a different carrier frequency), the UE operates on only one of the carriers at a given time among a pair of LTE and NR carriers . . . "

RAN1 AH#2 (June) sent a liaison statement (LS) to RAN2, RAN3 and RAN4 outlining a solution for single UL transmission for the UE operating in LTE+NR Dual connectivity mode in the LS R2-1707619 (3GPP TSG RAN WG2#99, Berlin, Germany, 21-25 Aug., 2017), summarizing, with the indications that single UL transmission is supported where NW synchronization between eNodeB and gNodeB is assumed (where there is at least one LTE carrier and at least one NR carrier of a different carrier frequency) and further conditions are met, which can be taken from that document.

Figure 4:
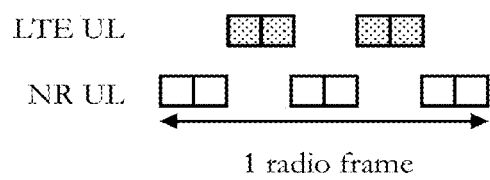
FIG. 4 illustrates a single uplink transmission scheme.

Furthermore, as also illustrated in FIG. 4, according to 3GPP document R2-1707822 (3GPP TSGRAN WG2 #99, Berlin, Germany, 21-25 Aug. 2017) an uplink activity pattern should be supported for single transmitting (Tx) UEs, and that this would be negotiated between the NR eNodeB and the (LTE) eNB.

Hence, according to currently known agreements, only the single UL transmission will be supported on certain problematic band combinations and the UE switches between the LTE and NR band for UL transmission, as exemplary illustrated in FIG. 4.

Hence, it has been recognized that with a careful UL power control design, the simultaneous UL transmissions on LTE and NR could be supported even in such problematic band combinations, where, for example, a "double peak" situation occurs.

Moreover, from the prior art, e.g. US 2015/0141068 A1, it is known, in the case of an intermodulation problem due to multiple uplink component carriers, to set an uplink output power control value for each of the component carriers and to provide a corresponding power instructing to a terminal device. However, in this prior art it assumed to reuse the conventional LTE measurement report signalling to indicate the downlink quality to an eNodeB.

But, it has been recognized that the LTE measurement report is originally provided for the mobility (handover), and the suitable trigger conditions (trigger timing, signal strength/interference level) could be different between the handover trigger and the intermodulation problem indication. For example, if the UE reports the signal quality degradation (e.g. RSRQ) to NR gNodeB (or LTE eNodeB), it is important for the NR gNodeB (or LTE eNodeB) to distinguish the intermodulation problem from a cellular coverage problem, since depending on the root cause the NR gNodeB (or LTE eNodeB) should perform a different action.

In addition, as can be taken from the discussion above referring to RP-172085, the 3GPP is currently considering the restriction of more than one Tx carrier, i.e. restriction to single UL transmission, in order to avoid the intermodulation problem.

However, it has been recognized that if the NR gNodeB (or LTE eNodeB) receives further information from the UE, such as UE Tx power headroom information or an implicit indication by ignoring the uplink grant, the NR gNodeB (or LTE eNodeB) could select the better option among multiple options (UE capability of single UL transmission, time division multiplex operation for NR/LTE, power control with two UL transmissions and so on) rather than simply confine to single UL transmission capability.

Therefore, some of the embodiments, pertain to a new signalling or equivalent method, as will be discussed further below.

Thereby, in some embodiments, it is possible to maximize the radio resource utilization and to make good use of high speed NR link, to support simultaneous LTE-NR UL transmission, even on problematic band combinations having intermodulation distortion issues, via power control.

The corresponding trigger and signalling options and embodiments to initiate such power control are discussed further below. In some embodiments, with different signalling options, the network can also make decision to switch between single and simultaneous UL transmissions with power control of the user equipment.

Generally, power control of a user equipment using multiple carriers simultaneously is known (see exemplary US 2015/0141068 A1) and, thus, a more detailed description of the power control itself is omitted.

Some embodiments pertain to a user equipment (UE) for a mobile telecommunications system including circuitry including a receiver and transmitter and being configured to communicate with a new radio base station and a LTE base station, wherein the circuitry is further configured to indicate a coexistence indication to the new radio base station or to the LTE base station; and receive a power control instruction for controlling power output of the transmitter.

The user equipment may be generally configured to communicate with a new radio base station and a LTE base station, and it may, generally, communicate in a single transmission mode (either new radio or LTE) or in a dual transmission mode, where it communicates simultaneously over a new radio and LTE uplink (or downlink). In some embodiments, the user equipment may (dynamically) switch between single transmission mode and dual transmission mode.

Generally, the LTE base station may be based on the principles of LTE (LTE-A) and the new radio (NR) base station may be based on NR RAT, as also discussed above. The LTE base station may be based on the known eNodeB of LTE, as one example, and the NR base station may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE and NR, such as a hot spot device with a mobile communication interface, etc. Hence, in some embodiments, the user equipment is configured to perform communication with the NR base station and the LTE base station simultaneously, such that the above-discussed coexistence issue may occur in some embodiments.

The coexistence indication may explicitly or implicitly include information about the coexistence of new radio and LTE uplink (or downlink) transmission.

As discussed, the power control instruction may include an instruction for reducing the output power of the UE circuitry, for example, for the NR transmission and for the LTE transmission. For instance, an output power value may be determined which forms an upper limit for the sum of the output power of the NR transmission and the output power for the LTE transmission. The output power of the NR transmission and of the LTE transmission may have the same value or it may have different values, wherein the sum of the NR transmission output power and the LTE transmission output power may stay below the given output power threshold value. Moreover, an intermodulation power may be detected and taken into account for determining the NR transmission output power and the LTE transmission output power, without limiting the present disclosure in that regard. As discussed, for example, the principles as disclosed in US 2015/0141068 A1 may be applied in some embodiments.

In some embodiments, the coexistence indication is indicated explicitly, e.g. by transmitting the coexistence indication to the new radio base station and/or the LTE base station, or implicitly (e.g. without explicit signaling), as will also discussed further below.

The coexistence indication may be indicated when a predefined combination of a new radio transmission band and a LTE transmission band is detected. As discussed above, in some embodiments combinations of new radio transmission band and LTE transmission band are known (and may also be changed dynamically) and it can be known in advance that certain combinations may result in the "double peak" situation, for example. Hence, in some embodiments, upon detection that such the UE circuitry tunes to such a known (problematic) combination, the coexistence indication may be indicated (e.g. transmitted).

The coexistence indication may be indicated when additionally a downlink performance degradation is detected. Hence, in some embodiments, in addition to the problematic band combination, also a downlink performance degradation must be detected and only then the coexistence indication is indicated (e.g. transmitted).

The coexistence indication may be indicated when it is detected that the receiver or transmitter of the UE circuitry tunes to the predefined combination of the new radio transmission band and the LTE transmission band.

The coexistence indication may be indicated, based on performance information associated with the combination of the new radio transmission band and the LTE transmission band. The performance information may be information collected in the past and may, thus, reflect a performance history for a specific band combination. Hence, if from this performance history it is known that a specific band combination is problematic (based on a performance below a predefined threshold), the coexistence indication may be indicated (e.g. transmitted).

The coexistence indication may be indicated, based on a predetermined threshold of an operation parameter of the receiver. The operation parameter may be indicative of a temperature of the receiver, a performance of the receiver, power consumption of the receiver, receiver sensitivity degradation or the like (based on that information it can be determined that the receiver might be interfered).

The coexistence indication may be indicated, based on detection of a predefined MIMO (multiple in multiple out) layer configuration. For instance, for predefined MIMO layer configuration it is known that the coexistence issue may occur.

In some embodiments, the coexistence indication is indicated (transmitted) included in a power headroom message. The power headroom message may include a data filed (one or more bits) indicating the coexistence of NR and LTE transmission.

The power headroom message may only contain power headroom information of serving cells associated with a predefined combination of a new radio transmission band and a LTE transmission band. As discussed above, such a predefined combination may be problematic (e.g. "double peak" situation may occur) and, thus, only the power headroom information of serving cells which are associated with such a problematic band combination is transmitted in the power headroom message.

In some embodiments, the coexistence indication is indicated (e.g. transmitted) included in a user equipment capability signaling.

In some embodiments, as mentioned, the coexistence indication is explicitly indicated by transmitting it to the new radio base station or to the LTE base station.

In some embodiments, the coexistence indication is implicitly indicated by skipping an allocated uplink grant. Hence, the base station can detect that there is a coexistence indication since the user equipment does not transmit any data on the granted and allocated uplink channel.

The allocated uplink grant may be on a predefined band included in a predefined (problematic, as discussed above) combination of a new radio transmission band and a LTE transmission band.

In some embodiments, the uplink grant may refer to the uplink grant that is allocated for uplink Semi-Persistent Scheduling.

Alternatively, if the uplink grant is high priority or high QoS required (e.g delay-sensitive QoS for URLCC applications), the UE may send both LTE/NR uplink instead of skipping an allocated uplink grant and the UE could ignore the downlink negative effect. For example, in the case that the impacted downlink subframe is not PSS/SSS/PBCH and/or PDSCH for system information, the UE can ignore it. The UE may need the retransmission of downlink data again, but the impact may not be (very) critical.

The coexistence indication may be indicated, based on transmission of a measurement report, wherein the measurement report may be a channel state information measurement report or a downlink coverage measurement report.

The measurement report may be transmitted, based on a predefined event, wherein the predefined event may include at least one of the following information: two uplinks without power restriction for intermodulation are allowed; two uplinks with power control for intermodulation are allowed; and only single uplink is allowed.

In some embodiments, the coexistence indication includes an indication of at least one subframe for simultaneous new radio and LTE uplink transmission. The subframe may be a TDM subframe for NR uplink transmission and the coexistence indication may include a TDM pattern configuration for simultaneous new radio and LTE uplink transmission. The at least one subframe may be a subframe where the DL receiver of the UE is not (or only negligible) interfered. Hence, the pattern may indicate NR subframes where the UE can (or cannot) transmit when such pattern is informed to the LTE base station and vice versa. The TDM pattern indicated by the coexistence indication may include the option of single transmission or simultaneous transmissions from the UE point of view.

Some embodiments, pertain to a base station for a mobile telecommunications system including circuitry configured to communicate with at least one user equipment (e.g. as discussed herein), the at least one user equipment being configured to communicate with a new radio base station and a LTE base station, wherein the circuitry is further configured to detect a coexistence indication (as indicated (explicitly or implicitly by the UE, as discussed); and transmit a power control instruction to the at least one user equipment, based on the detected coexistence indication.

The base station may be a NR base station or a LTE base station as discussed herein.

The circuitry may detect the coexistence indication in a received power headroom message, as also discussed above. As discussed above, the power headroom message may only contain power headroom information of serving cells associated with a predefined combination of a new radio transmission band and a LTE transmission band.

The circuitry may detect the coexistence indication in a received user equipment capability signaling.

As discussed, the coexistence indication may be received from the at least one user equipment.

The circuitry may detect the coexistence indication by detecting that the at least one user equipment skipped an allocated uplink grant, as also discussed above. This may be detected by a zero or non-existing transmission on the granted uplink channel. As discussed, the allocated uplink grant may be on a predefined band included in a predefined (problematic, as discussed) combination of a new radio transmission band and a LTE transmission band.

As discussed, the coexistence indication may be detected, based on a measurement report received from the at least one user equipment, wherein the measurement report may be a channel state information measurement report or a downlink coverage measurement report.

In some embodiments, as discussed above, the measurement report is received, based on a predefined event (wherein the predefined event is detected by the UE as discussed above).

The predefined event may include two uplinks without power restriction for intermodulation are allowed, which may be the case for example, when the UE is near a center of a macro cell or the like. This information may include a signal strength measurement information or a channel quality indicator information. Hence, based on the signal strength or channel quality indicator, the circuitry may determine whether the UE can use the dual (uplink) transmission mode or only a single (uplink) transmission mode. The power control instruction includes information to activate an LTE uplink and a new radio uplink when the signal strength or the quality indicator is above a predefined threshold.

In some embodiments, the predefined event includes "two uplinks with power control for intermodulation are allowed" information, and thus, the power control instruction may include power control information to control output power of the transmitter of the at least one user equipment.

In some embodiments, the predefined event includes only single uplink is allowed information, and, thus, the power control instruction may include information to activate only one uplink channel. Hence, the user equipment performs single (uplink) transmission either in the NR or LTE band.

In some embodiments, the coexistence indication includes an indication of at least one subframe for simultaneous new radio and LTE uplink transmission, as also discussed above. Hence, the base station may use according subframes for transmission, which (likely) do not lead to the "double peak" situation and, thus, may not interfere the downlink receiver of the UE.

Hence, in some embodiments, it is only the UE which has the ability to detect the co-existence problem due to inter-modulation issue and the network has no direct understanding of whether a UE is experiencing performance degradation due to LTE-NR co-existence or not. Thus, some of the embodiments, as discussed, provide a UE that sends a coexistence indication to the network once the problem occurs, such that the network gets knowledge about the coexistence problem.

Although above processes have been described for a (NR/LTE) base station and a user equipment, the processes described herein may also pertain to a method for mobile telecommunications.

The methods as described herein are also implemented in some embodiments as a computer program causing a computer and/or a processor and/or circuitry to perform the method, when being carried out on the computer and/or processor and/or circuitry. In some embodiments, also a nontransitory computer-readable recording medium is provided that stores therein a computer program product, which, when executed by a processor/circuitry, such as the processor/circuitry described herein, causes the methods described herein to be performed.

Triggers for UE to Send Coexistence Indication to Network

Returning to FIG. 5, there is illustrated a first embodiment of a mobile telecommunications system method 20, which may be performed by the UE (e.g. UE 6 of FIG. 1) and an associated eNodeB (NR eNodeB 5a (5b) or LTE eNodeB 3a (3b)) and which uses a first type of trigger (performance degradation).

At 21, the UE detects a downlink (LTE or NR) performance degradation, e.g. based on the fact that it can't decode LTE PDCCH or the RSRP on the reference signal is below certain threshold.

At 22, the UE additionally correlates this sudden decrease in radio conditions with simultaneous uplink transmission timing on problematic band combinations.

When the trigger condition at 21 occurs, the UE transmits at 23 the coexistence indication to the eNodeB (NR and/or LTE), which receives this coexistence indication at 24.

The eNodeB analyzes the coexistence indication and transmits a corresponding power control instruction at 25 to the UE, which is received by the UE at 26. At 27, the UE (its circuitry) controls power of the transmitter circuitry in accordance with the received power control instruction.

Figure 6:
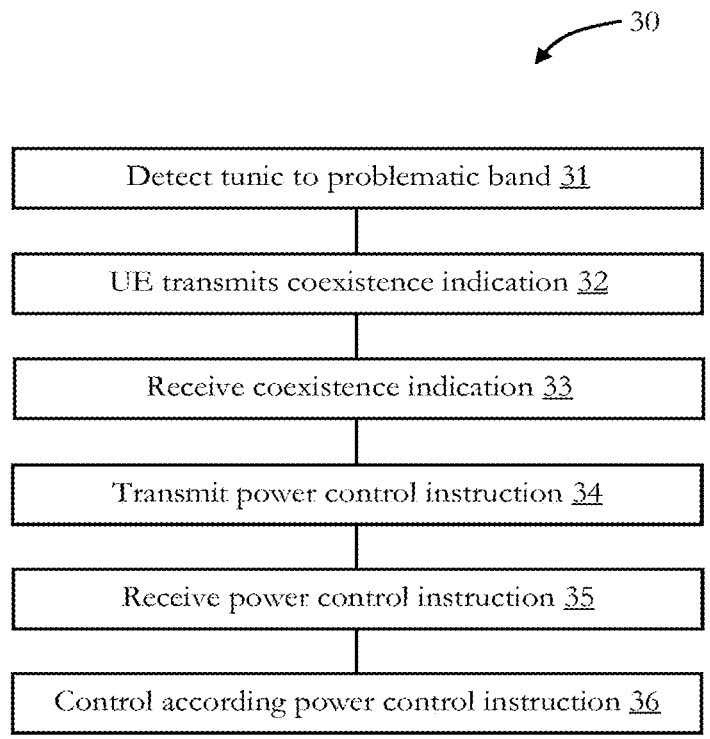
FIG. 6 illustrates a second embodiment of a mobile telecommunications method using a second trigger.

FIG. 6 illustrates a second embodiment of a mobile telecommunications system method 30, which may be performed by the UE (e.g. UE 6 of FIG. 1) and an associated eNodeB (NR eNodeB 5a (5b) or LTE eNodeB 3a (3b)) and which uses second type of trigger (tuning to problematic channel).

At 31, the UE detects that the circuitry (receiver/transmitter) is going to tune onto a problematic band, which may be a NR band or LTE band of a problematic combination, as discussed above, where, for example, a double peak situation may occur.

Before the UE experiences a potential downlink performance degradation, the UE sends, at 32, a coexistence indication to the network for further UL transmit power instructions. The UE may also know the problematic band from previous experience, which may be stored information in a storage.

The network, e.g. eNodeB (NR and/or LTE) receives the coexistence indication at 33 and transmits, based on the received coexistence indication, a power control instruction to the UE at 34, which is received by the UE at 35. At 36, the UE performs power control in accordance with the received power control instruction.

Figure 7:
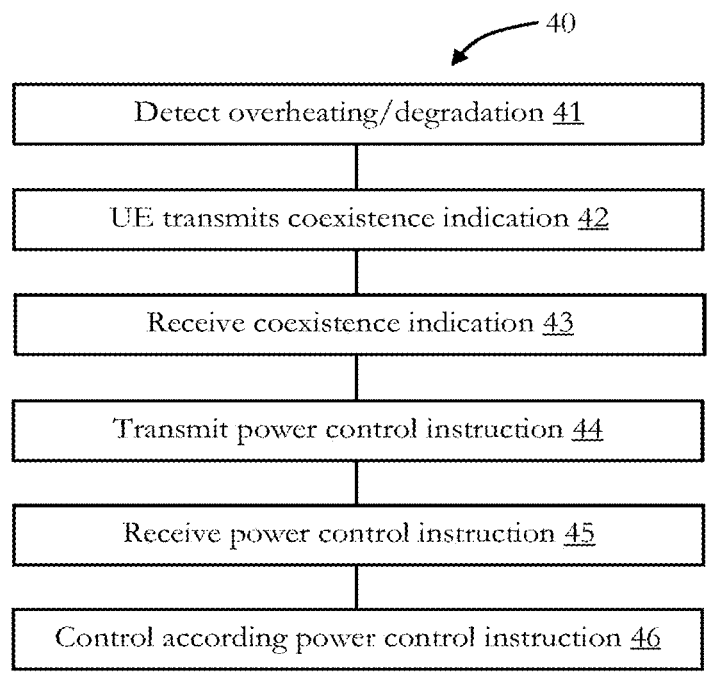
FIG. 7 illustrates a third embodiment of a mobile telecommunications method using a third trigger.

FIG. 7 illustrates a third embodiment of a mobile telecommunications system method 40, which may be performed by the UE (e.g. UE 6 of FIG. 1) and an associated eNodeB (NR eNodeB 5a (5b) or LTE eNodeB 3a (3b)) and which uses a third type of trigger (overheating and degradation of receiver sensitivity).

At 41, the UE detects a problematic band combinations based on detecting overheating and/or degradation of the receiver sensitivity, i.e. based on an operation parameter of the receiver. The problematic band combination may also be detected, based on an enhanced MIMO layer configuration.

The UE sends, at 42, a coexistence indication to the network for further UL transmit power instructions.

The network, e.g. eNodeB (NR and/or LTE) receives the coexistence indication at 43 and transmits, based on the received coexistence indication, a power control instruction to the UE at 44, which is received by the UE at 45. At 46, the UE performs power control in accordance with the received power control instruction.

Coexistence Indication and its Variations

Option 1: One Shot PHR

In LTE, the power headroom reporting (PHR) is used to provide the serving cell with the information about the difference between the nominal UE maximum transmit power and the estimated power for UL-SCH transmission per activated serving cell. PHR will be triggered by pathloss change or timer.

In an embodiment, a trigger is used which will be based on when coexistence issue has been observed by the UE.

Figure 5:
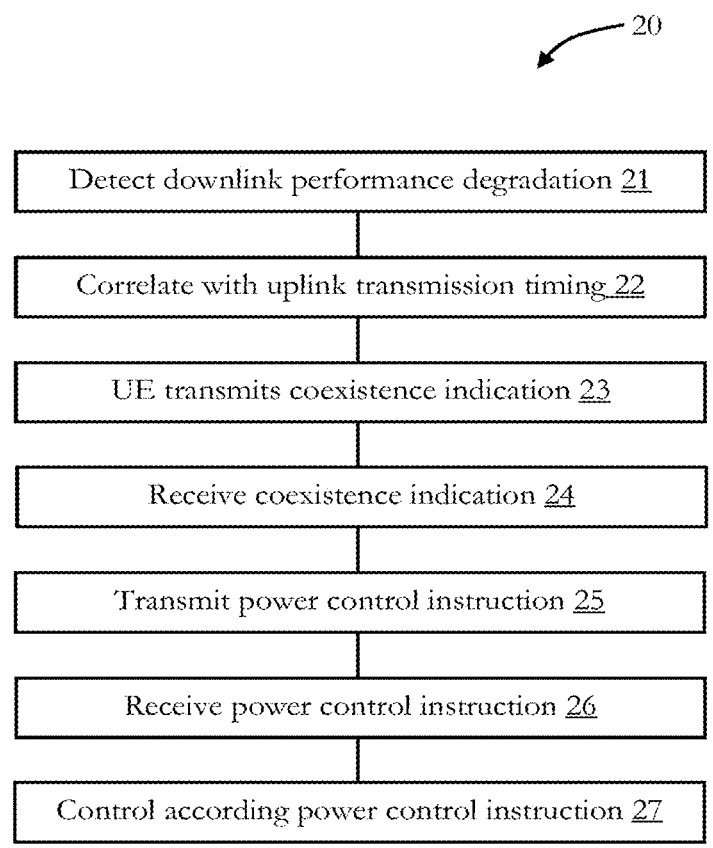
FIG. 5 illustrates a first embodiment of a mobile telecommunications method using a first trigger.

In this embodiment, the coexistence indication will be sent by the UE in a one shot PHR, e.g. on NR uplink or on LTE uplink (in the case that LTE is going to include this) according to at least one of the triggers as defined above (see embodiments of FIGS. 5 to 7).

The format of this PHR can refer to the LTE spec 36.321 (3GPP TS 36.321 V14.4.0 (2017-09), 3rd Generation Partnership Project; Technical Specification Group Radio Access Network; Evolved Universal Terrestrial Radio Access (E-UTRA); Medium Access Control (MAC) protocol specification, (Release 14)), see table 6.1.3.6b-1: Dual Connectivity PHR MAC Control Element, which is illustrated in FIG. 8.

Figures 8, 9:
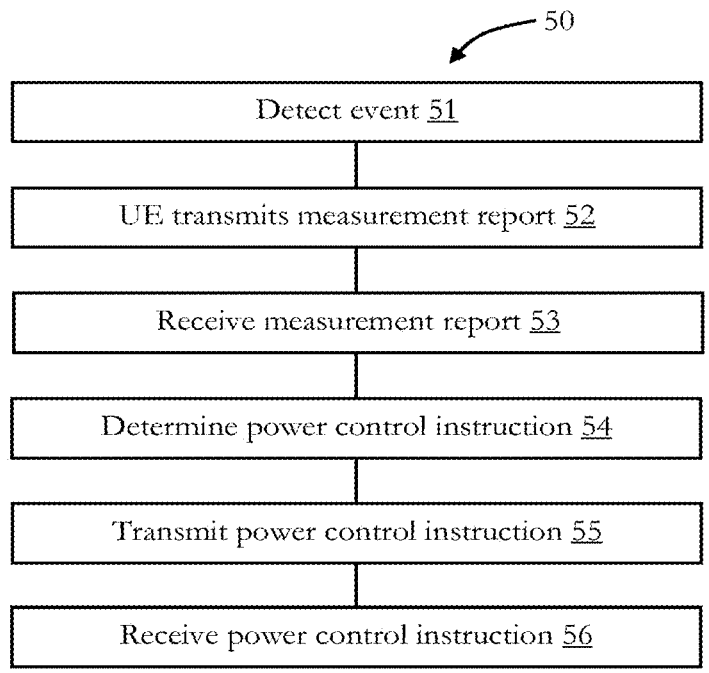
FIG. 8 illustrates a table depicting bits in a power headroom message.
FIG. 9 illustrates an embodiment of a mobile telecommunications method using a first event.

One bit of the bits in this table of FIG. 8 can be used to indicate LTE-NR coexistence.

Moreover, the PHR can only contain the PH information on the serving cells (e.g. cell 2a/b or 4a/b of FIG. 1) of problematic band combinations and the network can optionally take the previously received PHR by the same UE which is triggered by periodic timer into account for the power adjustment.

After receiving the one shot PHR from the UE (including the coexistence indication), the network, e.g. eNodeB (NR and/or LTE) can identify the problem and send the power control command on LTE and NR downlink in order to adjust the uplink LTE and NR UL transmit power to address the intermodulation problem, as also discussed above for the embodiments of FIGS. 5 to 7.

Option 2: UE Capability Signaling

In another embodiment, the UE sends the problematic band combination (coexistence indication) on which the UE is experiencing performance degradation or potentially going to be impacted by the simultaneous UL transmissions in the (temporary) UE capability signaling.

In another embodiment, in the UE capability signaling, the UE can delete the problematic band combinations (pre-defined by RAN4 as example) on which simultaneous uplink transmission could be supported with proper power control. With this, network can potentially support the simultaneous uplink transmissions on certain problematic band combinations. Or a new RRC signaling to support this can be defined.

As also discussed above for embodiments of FIGS. 5 to 7, after receiving this information (i.e. coexistence indication), the network (e.g. eNodeB (NR and/or LTE) will adjust the LTE and NR UL transmit power accordingly by transmitting a power control instruction to the UE.

Since UE capability is exchanged at the time of attach or downloaded from the MME (Mobile Management Entity), the traditional UE capability framework does not offer flexibility to dynamically signal the power control situation, such that in this embodiment, the temporary capability information exchange procedure is used. Temporary UE capability procedure is standardized for the cases where e.g. overheating takes place in the UE and these principles are implemented accordingly in this embodiment.

Option 3: Skip UL Grant as an Implicit Indication

In another embodiment, the UE skips the allocated UL grant on the problematic band as an implicit indication of the coexistence indication to the network (e.g. eNodeB (NR and/or LTE) and does not transmit user data.

As discussed above for embodiments of FIGS. 5 to 7, in response to receipt of the coexistence indication, the network (e.g. eNodeB (NR and/or LTE) will adjust the corresponding transmit power in LTE and NR UL after detecting a null transmission on the allocated UL grant (channel).

Normally, the network will request the UE to increase power allocation if it detects missed transmission for a grant assuming that the UE radio conditions have deteriorated. However, this option requires that the UE reduces its power. Therefore, this option is used with other options in order for the network to identify that an intermodulation issue occurs.

Option 4: New Events of Measurement Report

In these embodiments, the conventional measurement report mechanism based on downlink coverage or CSI measurements reporting is reused, but new events/reporting criteria are introduced, since the conventional LTE has RRM (Radio Resource Management) events A,B,C are mainly for mobility functions such as intra/inter frequency handover, carrier aggregation Scell addition/remove.

In the following, three different embodiments using additional events for IM (intermodulation) to set the optimal thresholds/trigger conditions are described. And the parameters in these events e.g. thresholds could be configured/updated by network.

Event IM1 ("Two Uplinks without Power Restriction for Intermodulation are Allowed")

FIG. 9 illustrates an embodiment of a mobile telecommunications system method 50, which may be performed by the UE (e.g. UE 6 of FIG. 1) and an associated eNodeB (NR eNodeB 5a (5b) or LTE eNodeB 3a (3b)).

In this embodiment, this event means that that UE has no restriction of UL and, thus, can transmit in the dual mode (i.e. NR and LTE simultaneously), wherein at 51, the UE detects this event (i.e. that the dual mode is possible without restriction).

In this event IM1 "two uplinks without power restriction for intermodulation are allowed", for example, the signal strength (RSRP) or CQI (Channel Quality Indicator) measurements is better than a pre-defined value, which means that the UE is near the center of a serving (macro) cell (e.g. LTE cell 2a/b or NR cell 4a/b).

The UE transmits the corresponding measurement report (coexistence indication) at 52 to the network, e.g. eNodeB (NR and/or LTE), which is received at 53 by the network, e.g. eNodeB (LTE or NR).

The eNodeB (NR and/or LTE) determines a corresponding power control instruction, at 54, based on the received measurement report and that under this circumstance the UE Tx power level could be low. In addition, it is determined that a signal quality (RSRQ) is better than a pre-define value, which means that a small impact of Intermodulation is expected.

In that case, the eNodeB (NR and/or LTE) activates both the LTE UL and the NR UL without restriction by transmitting a corresponding power control instruction to the UE at 55, wherein the UE receives this instruction at 56 and controls in accordance with the received power control instruction the transmitter.

Event IM2 "Two Uplinks with Power Control for Intermodulation are Allowed")

Figure 10:
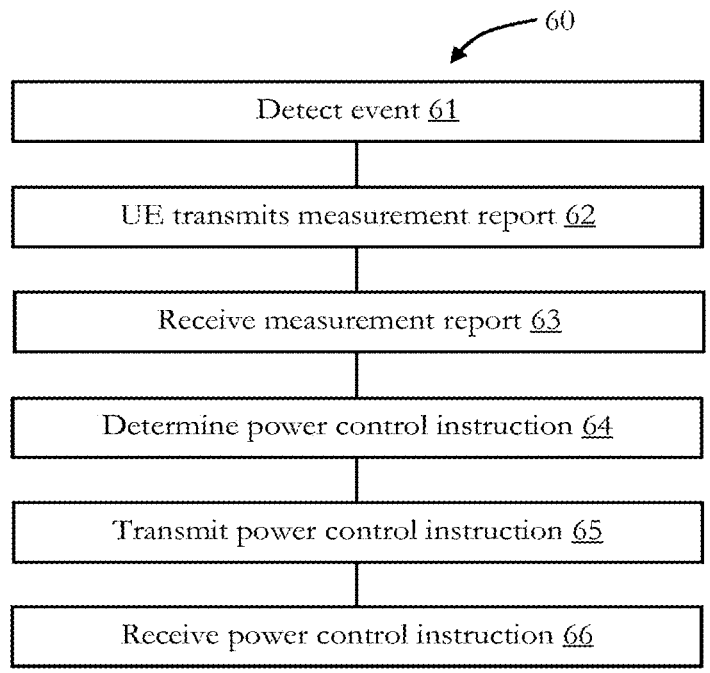
FIG. 10 illustrates an embodiment of a mobile telecommunications method using a second event.

FIG. 10 illustrates an embodiment of a mobile telecommunications system method 60, which may be performed by the UE (e.g. UE 6 of FIG. 1) and an associated eNodeB (NR eNodeB 5a (5b) or LTE eNodeB 3a (3b)).

This event IM2 means two uplinks are allowed with TDM or under power control (or similar to option 1), and at 61 the UE detects this event and the UE transmits at 63 a corresponding measurement report which is received at 63 by the network, e.g. eNodeB (NR and/or LTE).

Based on the measurement report, the eNodeB (NR and/or LTE) determines corresponding power control instruction at 64.

At 65, the eNodeB (NR or LTE) activates the selected solution of IM, for example, the temporary Tx power restriction, power transmitting the power control construction at 65, which is received at 66 by the UE and the UE controls the transmitter accordingly.

The thresholds for activating a corresponding solution of IM (power control) depend on the combination of bands/frequency.

Event IM3 ("Only Single Uplink is Allowed")

Figure 11:
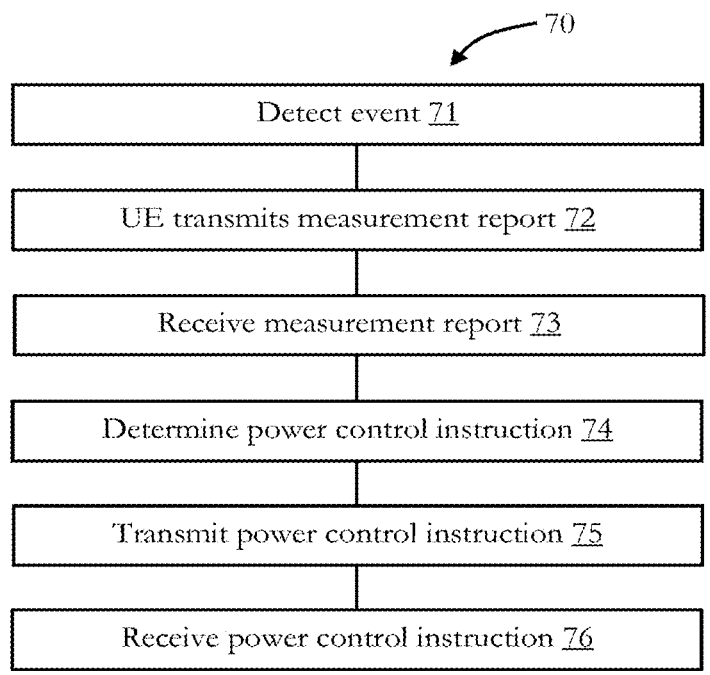
FIG. 11 illustrates an embodiment of a mobile telecommunications method using a third event.

FIG. 11 illustrates an embodiment of a mobile telecommunications system method 60, which may be performed by the UE (e.g. UE 6 of FIG. 1) and an associated eNodeB (NR eNodeB 5a (5b) or LTE eNodeB 3a (3b)).

In this embodiment, this event IM3 means only single UL is allowed, which is detected by the UE at 71 and the UE transmits a corresponding measurement report at 72, which is received by the network, e.g. eNodeB (NR and/or LTE) at 73.

In this event, for example, a signal strength is better than a pre-defined value, but the signal quality is worse than a pre-defined value.

Hence, the power control solution could be useless under high interference circumstance.

Alternatively, for example, a signal strength is worse than a pre-defined value, which means the UE may be required to transmit at high power.

Based on this, the eNodeB (NR and/or LTE) determines a power control instruction at 74 and transmits it, at 75, wherein the UE receives the power control instruction, at 76, and performs control of the transmitter accordingly.

In some embodiments, it is common to the above events if they are configured as RRM measurement events that these events have an offset/hysteresis (in the time domain).

In particular, in the embodiments of event IM2 and event IM3 the measurement report should be transmitted (a little bit) earlier than according to the timing when the IM problem becomes severe, since, otherwise, the UE could miss the opportunity to transmit the event (measurement report).

Summarizing, in some embodiments, in order to maximize the radio resource utilization and for making full use of high speed NR link, some embodiments support simultaneous LTE-NR UL transmission even on problematic band combinations via power control.

In contrast to current discussions in prior art, where only the single TX is supported for LTE-NR coexistence on certain band combinations, some embodiments allow the simultaneous LTE-NR UL transmission even in problematic band combinations with careful power control strategy, as discussed above, also based on providing corresponding trigger and signalling options to initiate such power control.

Figure 12:
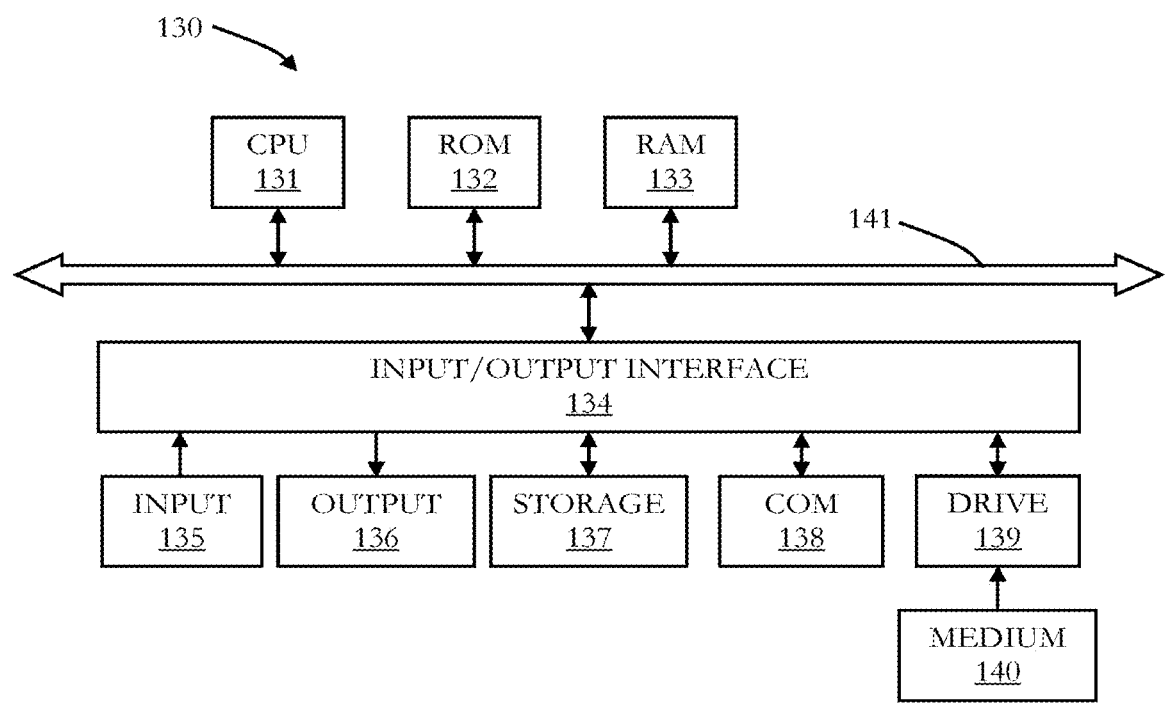
FIG. 12 illustrates a general purpose computer which can implement anyone of the circuitries, base stations and user equipments as described herein.

In the following, an embodiment of a general purpose computer 130 is described under reference of FIG. 12. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic tablet, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SCFDMA (uplink)) and network interfaces (implementing for example protocols such as S1-AP, GTPU, S1-MME, X2-AP, or the like). Moreover, the computer 130 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for a mobile telecommunications system comprising circuitry including a receiver and a transmitter and being configured to communicate with a new radio base station and a LTE base station, wherein the circuitry is further configured to:

indicate a coexistence indication to the new radio base station or to the LTE base station; and receive a power control instruction for controlling power output of the transmitter.

(2) The user equipment of (1), wherein the coexistence indication is indicated when a predefined combination of a new radio transmission band and a LTE transmission band is detected.

(3) The user equipment of (2), wherein the coexistence indication is indicated when additionally a downlink performance degradation is detected.

(4) The user equipment of (2), wherein the coexistence indication is indicated when it is detected that the receiver or transmitter tunes to the predefined combination of the new radio transmission band and the LTE transmission band.
(5) The user equipment of (4), wherein the coexistence indication is indicated, based on performance information associated with the combination of the new radio transmission band and the LTE transmission band.
(6) The user equipment of anyone of (1) to (5), wherein the coexistence indication is indicated, based on a predetermined threshold of an operation parameter of the receiver.
(7) The user equipment of anyone of (1) to (6), wherein the coexistence indication is indicated, based on detection of a predefined MIMO layer configuration.
(8) The user equipment of anyone of (1) of (7), wherein the coexistence indication is indicated included in a power headroom message.
(9) The user equipment of (8), wherein the power headroom message only contains power headroom information of serving cells associated with a predefined combination of a new radio transmission band and a LTE transmission band.
(10) The user equipment of anyone of (1) to (9), wherein the coexistence indication is indicated included in a user equipment capability signaling.
(11) The user equipment of anyone of (1) to (10), wherein the coexistence indication is explicitly indicated by transmitting it to the new radio base station or to the LTE base station.
(12) The user equipment of anyone of (1) to (11), wherein the coexistence indication is implicitly indicated by skipping an allocated uplink grant.
(13) The user equipment of (12), wherein the allocated uplink grant is on a predefined band included in a predefined combination of a new radio transmission band and a LTE transmission band.
(14) The user equipment of anyone of (1) to (13), wherein the coexistence indication is indicated, based on transmission of a measurement report.
(15) The user equipment of (14), wherein the measurement report is a channel state information measurement report or a downlink coverage measurement report.
(16) The user equipment of (14) or (15), wherein the measurement report is transmitted, based on a predefined event.
(17) The user equipment of (16), wherein the predefined event includes at least one of the following information: two uplinks without power restriction for intermodulation are allowed, two uplinks with power control for intermodulation are allowed, only single uplink is allowed.
(18) The user equipment of (1), wherein the coexistence indication includes an indication of at least one subframe for simultaneous new radio and LTE uplink transmission.
(19) A base station for a mobile telecommunications system comprising circuitry configured to communicate with at least one user equipment, the at least one user equipment being configured to communicate with a new radio base station and a LTE base station, wherein the circuitry is further configured to:
    detect a coexistence indication; and
    transmit a power control instruction to the at least one user equipment, based on the detected coexistence indication.
(20) The base station of (19), wherein the coexistence indication is detected in a received power headroom message.
(21) The base station of (19) or (20), wherein the power headroom message only contains power headroom information of serving cells associated with a predefined combination of a new radio transmission band and a LTE transmission band.
(22) The base station of anyone of (19) to (21), wherein the coexistence indication is detected in a received user equipment capability signaling.
(23) The base station of anyone of (19) to (22), wherein the coexistence indication is received from the at least one user equipment.
(24) The base station of anyone of (19) to (23), wherein the coexistence indication is detected by detecting that the at least one user equipment skipped an allocated uplink grant.
(25) The base station of (24), wherein the allocated uplink grant is on a predefined band included in a predefined combination of a new radio transmission band and a LTE transmission band.
(26) The base station of anyone of (19) to (25), wherein the coexistence indication is detected, based on a measurement report received from the at least one user equipment.
(27) The base station of (26), wherein the measurement report is a channel state information measurement report or a downlink coverage measurement report.
(28) The base station of (26) or (27), wherein the measurement report is received, based on a predefined event.
(29) The base station of (28), wherein the predefined event includes two uplinks without power restriction for intermodulation are allowed information.
(30) The base station of (29), wherein the two uplinks without power restriction for intermodulation are allowed information includes a signal strength measurement information or a channel quality indicator information.
(31) The base station of (30), wherein the power control instruction includes information to activate an LTE uplink and a new radio uplink when the signal strength or the quality indicator is above a predefined threshold.
(32) The base station of (28), wherein the predefined event includes two uplinks with power control for intermodulation are allowed information.
(33) The base station of (32), wherein the power control instruction includes power control information to control output power of the transmitter of the at least one user equipment.
(34) The base station of (28), wherein the predefined event includes only single uplink is allowed information.
(35) The base station of (34), wherein the power control instruction includes information to activate only one uplink channel.
(36) The base station of anyone of (19) to (35), wherein the coexistence indication includes an indication of at least one subframe for simultaneous new radio and LTE uplink transmission.

The invention claimed is:
1. A user equipment for a mobile telecommunications system comprising circuitry including a receiver and a transmitter and being configured to communicate with a new radio base station and a LTE base station, wherein the circuitry is further configured to:
    detect that the receiver or transmitter is going to tune to a predefined combination of a new radio transmission band and a LTE transmission band, wherein the predefined combination is a known intermodulation problematic band combination,
    before the user equipment experiences a performance degradation in response to tuning onto the known problematic band combination, indicate a coexistence indication to the new radio base station or to the LTE base station; and receive a power control instruction for controlling power output of the transmitter based on a predefined threshold.

2. The user equipment of claim 1, wherein the coexistence indication is indicated when a predefined combination of the new radio transmission band and the LTE transmission band is detected.

3. The user equipment of claim 2, wherein the coexistence indication is indicated when additionally a downlink performance degradation is detected.

4. The user equipment of claim 1, wherein the coexistence indication is indicated based on performance information associated with the combination of the new radio transmission band and the LTE transmission band.

5. The user equipment of claim 1, wherein the coexistence indication is indicated, based on a predetermined threshold of an operation parameter of the receiver.

6. The user equipment of claim 1, wherein the coexistence indication is indicated based on detection of a predefined MIMO layer configuration.

7. The user equipment of claim 1, wherein the coexistence indication is indicated included in a power headroom message.

8. The user equipment of claim 7, wherein the power headroom message only contains power headroom information of serving cells associated with a predefined combination of a new radio transmission band and a LTE transmission band.

9. The user equipment of claim 1, wherein the coexistence indication is indicated included in a user equipment capability signaling.

10. The user equipment of claim 1, wherein the coexistence indication is explicitly indicated by transmitting it to the new radio base station or to the LTE base station.

11. The user equipment of claim 1, wherein the coexistence indication is implicitly indicated by skipping an allocated uplink grant.

12. The user equipment of claim 11, wherein the allocated uplink grant is on a predefined band included in a predefined combination of a new radio transmission band and a LTE transmission band.

13. The user equipment of claim 1, wherein the coexistence indication is indicated, based on transmission of a measurement report.

14. The user equipment of claim 13, wherein the measurement report is a channel state information measurement report or a downlink coverage measurement report.

15. The user equipment of claim 13, wherein the measurement report is transmitted based on a predefined event.

16. The user equipment of claim 15, wherein the predefined event includes at least one of the following information: two uplinks without power restriction for intermodulation are allowed, two uplinks with power control for intermodulation are allowed, only single uplink is allowed.

17. The user equipment of claim 1, wherein the coexistence indication includes an indication of at least one subframe for simultaneous new radio and LTE uplink transmission.

18. A base station for a mobile telecommunications system comprising circuitry configured to communicate with at least one user equipment, the at least one user equipment being configured to communicate with a new radio base station and a LTE base station, wherein the circuitry is further configured to:
  detect a coexistence indication before the user equipment experiences a performance degradation in response to tuning onto a predefined combination of a new radio transmission band and a LTE transmission band, wherein the predefined combination is a known intermodulation problematic band combination; and
  transmit a power control instruction to the at least one user equipment based on the detected coexistence indication.

19. The base station of claim 18, wherein the coexistence indication is detected in a received power headroom message.

20. The base station of claim 19, wherein the power headroom message only contains power headroom information of serving cells associated with a predefined combination of a new radio transmission band and a LTE transmission band.

* * * * *